United States Patent
Zhao et al.

(10) Patent No.: US 12,534,697 B2
(45) Date of Patent: Jan. 27, 2026

(54) ACOUSTIC FLUID-MEDIATED BOTTOM-UP BIOPRINTING DEVICE FOR FUNCTIONAL ORGANS WITH ULTRAHIGH CELL DENSITY AND PRINTING METHOD THEREFOR

(71) Applicant: NANJING DRUM TOWER HOSPITAL, Nanjing (CN)

(72) Inventors: Yuanjin Zhao, Nanjing (CN); Zhuhao Wu, Nanjing (CN)

(73) Assignee: NANJING DRUM TOWER HOSPITAL, Nanjing (CN)

( * ) Notice: Subject to any disclaimer, the term of this patent is extended or adjusted under 35 U.S.C. 154(b) by 0 days.

(21) Appl. No.: 19/216,832

(22) Filed: May 23, 2025

(65) Prior Publication Data

US 2025/0297202 A1 Sep. 25, 2025

Related U.S. Application Data

(63) Continuation of application No. PCT/CN2024/087479, filed on Apr. 12, 2024.

(30) Foreign Application Priority Data

Mar. 20, 2024 (CN) .......................... 202410317794.8

(51) Int. Cl.
*B29C 64/245* (2017.01)
*B29C 64/135* (2017.01)
(Continued)

(52) U.S. Cl.
CPC ........... *C12M 21/08* (2013.01); *B29C 64/135* (2017.08); *B29C 64/245* (2017.08); *B33Y 10/00* (2014.12);
(Continued)

(58) Field of Classification Search
CPC ............... B29C 64/124; B29C 64/129; B29C 64/135; B29C 64/245; B33Y 10/00; B33Y 30/00; B33Y 80/00
See application file for complete search history.

(56) References Cited

U.S. PATENT DOCUMENTS

| | | | |
|---|---|---|---|
| 5,790,167 A | 8/1998 | Nashimoto et al. | |
| 2023/0091230 A1* | 3/2023 | Kalpio | B29C 64/393 264/401 |

(Continued)

FOREIGN PATENT DOCUMENTS

| | | |
|---|---|---|
| CN | 2658982 Y | 11/2004 |
| CN | 107505249 A | 12/2017 |

(Continued)

*Primary Examiner* — JaMel M Nelson
(74) *Attorney, Agent, or Firm* — Bayramoglu Law Offices LLC

(57) ABSTRACT

An acoustic fluid-mediated bottom-up bioprinting device for functional organs with an ultrahigh cell density and a printing method are provided, the acoustic fluid-mediated bottom-up bioprinting device includes an array SAW chip, a printing container, a printing platform and a curing light source; the printing container is used for containing a printing ink; the printing platform is able to move upward and downward in the printing ink; the array SAW chip includes a plurality of interdigital electrodes; a central axis of each interdigital electrode deflects from a direction towards a center of the circle; the array SAW chip is in contact with the printing ink and is able to form a focused acoustic flow to aggregate the cells in the printing ink; the curing light source is able to expose a projection into the printing ink above the printing platform and cure the printing ink above the printing platform.

5 Claims, 7 Drawing Sheets

(51) Int. Cl.
*B33Y 10/00* (2015.01)
*B33Y 30/00* (2015.01)
*B33Y 80/00* (2015.01)
*C12M 3/00* (2006.01)
*B29L 31/00* (2006.01)

(52) U.S. Cl.
CPC .............. *B33Y 30/00* (2014.12); *B33Y 80/00* (2014.12); *B29L 2031/7532* (2013.01)

(56) References Cited

U.S. PATENT DOCUMENTS

| | | | | |
|---|---|---|---|---|
| 2023/0158741 | A1* | 5/2023 | Zhao | B29C 35/16 |
| | | | | 425/174.4 |
| 2023/0339181 | A1* | 10/2023 | Habibi | B33Y 10/00 |
| 2024/0018468 | A1* | 1/2024 | Serra | C12M 25/14 |

FOREIGN PATENT DOCUMENTS

| | | | | |
|---|---|---|---|---|
| CN | 109022277 | A | 12/2018 | |
| CN | 109103328 | A | 12/2018 | |
| CN | 109439513 | A | 3/2019 | |
| CN | 112646701 | A | 4/2021 | |
| CN | 112776325 | A | 5/2021 | |
| CN | 113601834 | A * | 11/2021 | ........... B29C 64/264 |
| CN | 113736649 | A | 12/2021 | |
| CN | 115468916 | A | 12/2022 | |
| CN | 115716334 | A | 2/2023 | |
| CN | 116148453 | A | 5/2023 | |
| CN | 116208119 | A | 6/2023 | |
| CN | 116240109 | A | 6/2023 | |
| CN | 116286335 | A | 6/2023 | |
| CN | 117665087 | A | 3/2024 | |
| JP | 2001144565 | A | 5/2001 | |

* cited by examiner 3D imaging of cells 3D imaging of cells

ACOUSTIC FLUID-MEDIATED BOTTOM-UP BIOPRINTING DEVICE FOR FUNCTIONAL ORGANS WITH ULTRAHIGH CELL DENSITY AND PRINTING METHOD THEREFOR

CROSS REFERENCE TO THE RELATED APPLICATIONS

This application is a continuation application of International Application No. PCT/CN2024/087479, filed on Apr. 12, 2024, which is based upon and claims priority to Chinese Patent Application No. 202410317794.8, filed on Mar. 20, 2024, the entire contents of which are incorporated herein by reference.

TECHNICAL FIELD

The invention belongs to the technical field of medical manufacturing, and relates to a bioprinting device, in particular to an acoustic fluid-mediated bottom-up bioprinting device for functional organs with an ultrahigh cell density and a printing method therefor.

BACKGROUND 3D bioprinting is a new technology that fabricates artificial organs and biomedical products with the use of a computer 3D model as "paper" and a special "bioink". With the rapid development of related technologies, 3D bioprinting has a broad application prospect in economic life, national defense and military, and other fields.

3D bioprinters are equipment that is driven by a digital 3D model to position and assemble biomaterials or cell units based on the principle of additive manufacturing to fabricate medical instruments, scaffolds for tissue engineering, tissue organs, and other products. The principle of 3D bioprinting is that cells and biomaterials are positioned to be printed accurately to eventually form human organs in line with anatomical structures and functional requirements. The basic process of 3D bioprinting includes the application of the medical imaging technology, the use of computer-aided design software, printing of biomaterials and cells, and cell culture and organ maturation. By means of this process, regeneration and transplantation of human organs may be realized.

Although there have already been some bioprinting methods or devices at present, for natural tissues with a cell density that is generally over 40 million cells per milliliter, existing bioprinting methods or devices cannot realize printing of tissues or organs with an ultrahigh cell density because cellular damage is often caused by mechanical squeezing or traction of high-cell density bioinks used in jet-based bioprinting and there is no effective and controllable cell assembly strategy in lithography-based bioprinting, and all these bottlenecks limit the application of traditional 3D bioprinting.

SUMMARY

The invention provides an acoustic fluid-mediated bottom-up bioprinting device for functional organs with an ultrahigh cell density and a printing method therefor to overcome the defects in the prior art.

To fulfill the above purpose, the invention provides an acoustic fluid-mediated bottom-up bioprinting device for functional organs with an ultrahigh cell density, which has such characteristics: includes an array surface acoustic wave (SAW) chip, a printing container, a printing platform and a curing light source; the printing container is used for containing a printing ink, and the printing ink is a mixed solution of cells and a photocurable bioink; the printing platform is horizontally arranged in the printing container and is able to move upward and downward in the printing ink; the array SAW chip and the curing light source are both fixed above the printing container; the array SAW chip includes a plurality of interdigital electrodes which are arranged in a same horizontal plane and distributed on a circle; the interdigital electrodes are focused SAW interdigital electrodes; a central axis of each interdigital electrode deflects from a direction towards a center of the circle (that is, deflects counterclockwise from a connecting line between the interdigital electrode and the center of the circle), and the plurality of interdigital electrodes deflect in a same direction, all clockwise or counterclockwise; the array SAW chip is in contact with the printing ink (the array SAW chip may be in contact with the surface of the printing ink or stretch into the printing link to realize contact) and is able to form a focused acoustic flow in the printing ink between the array SAW chip and the printing platform to aggregate the cells in the printing ink; the curing light source is able to expose a projection into the printing ink above the printing platform and cure the printing ink above the printing platform.

Further, the invention provides an acoustic fluid-mediated bottom-up bioprinting device for functional organs with an ultrahigh cell density, which further has such characteristics: wherein, in the array SAW chip, the plurality of interdigital electrodes have a same angle of deflection.

Further, the invention provides an acoustic fluid-mediated bottom-up bioprinting device for functional organs with an ultrahigh cell density, which further has such characteristics: wherein, an angle of deflection of the interdigital electrodes is greater than 0° and less than 90°.

Further, the invention provides an acoustic fluid-mediated bottom-up bioprinting device for functional organs with an ultrahigh cell density, which further has such characteristics: wherein, in the SAW chip, the plurality of interdigital electrodes are distributed uniformly on the circle. The plurality of interdigital electrodes share a same piezoelectric substrate, that is, multiple electrode patterns are machined on the same piezoelectric substrate.

The array SAW chip is made based on a semiconductor preparation process. First, the electrode arrangement is designed by means of computer-assisted software, and then metal electrodes are machined on a piezoelectric substrate by means of standard soft photolithography and electron beam metal deposition, the method specifically incudes: obtaining a mask with electrode patterns of a plurality of interdigital electrodes by thermoforming, spin-coating a lithium niobate piezoelectric substrate with a positive photoresist, and obtaining the electrode patterns on the mask by replication and elution; depositing a chromium film and a gold film on the piezoelectric substrate by electron beam evaporation; and obtaining an array SAW chip by elution with 60° C. formaldehyde.

Further, the invention provides an acoustic fluid-mediated bottom-up bioprinting device for functional organs with an ultrahigh cell density, which further has such characteristics: wherein, 3-10 pairs of electrodes are arranged in the interdigital electrode, and a wavelength of the interdigital electrodes is 200-350 μm. A drive signal for the array SAW chip is a sine alternating current input of a 250 mVpp voltage.

Further, the invention provides an acoustic fluid-mediated bottom-up bioprinting device for functional organs with an ultrahigh cell density, which further has such characteristics: wherein, the printing container is able to move upward and downward.

Further, the invention provides an acoustic fluid-mediated bottom-up bioprinting device for functional organs with an ultrahigh cell density, which further has such characteristics: wherein, the device further includes a printing head, and the array SAW chip is fixed to a bottom of the printing head, specifically, the piezoelectric substrate is fixed to the printing head, and the electrode patterns (gold electrodes) face the printing ink.

The invention further provides a printing method for the acoustic fluid-mediated bottom-up bioprinting device for functional organs with an ultrahigh cell density, which has such characteristics: for a monolayer tissue organ, the printing method includes the following steps: S1.1, a circular projection is exposed by the curing light source to cure the printing ink to form a circular acoustic field boundary; S1.2, the array SAW chip is turned on to form a focused SAW acoustic field to induce a fluid vortex within the acoustic field boundary to aggregate the cells in the printing ink; S1.3, a projection in a shape to be printed is exposed by the curing light source to cure the printing ink to form a tissue organ, which contains the aggregated cells and is in the shape to be printed; S1.4, a projection containing the shape of the printed tissue organ is exposed by the curing light source to cure the printing ink to form a monolayer print structure containing the tissue organ formed in S1.3.

Further, the invention provides a printing method for the acoustic fluid-mediated bottom-up bioprinting device for functional organs with an ultrahigh cell density, which further has such characteristics: for a multilayer tissue organ, the printing method includes the following steps: S1, a monolayer print structure is printed according to the printing method for the monolayer tissue organ; S2, the printing platform is moved downward, and S1.1-S1.4 are repeated to print a second layer of print structure on the monolayer print structure; S3, S2 is repeated n times to obtain an (n+2)-layer print structure, wherein n≥0.

Further, the invention provides a printing method for the acoustic fluid-mediated bottom-up bioprinting device for functional organs with an ultrahigh cell density, which further has such characteristics: wherein, the distance between the array SAW chip/a lower surface of a previous layer of print structure and the printing platform is equal to the thickness of a current layer of print structure.

The invention has the following beneficial effects: the acoustic fluid-mediated bottom-up bioprinting device for functional organs with an ultrahigh cell density and the printing method therefor provided by the invention are used for 3D printing of artificial organs with an ultrahigh cell density and a complex geometric structure. According to the printing method, cells are aggregated on a prepolymerized solid-liquid interface by means of a vortex induced by focused SAWs to obtain a cell hydrogel carrier with a cell density equivalent to that of natural tissues. Then, an artificial cell structure with complex 3D layers is generated by integrated bottom-up photolithography. In addition, the high cell density allows for a more mature function of a cell tissue model. Cell aggregation induced by acoustic waves may greatly increase the concentration of cells in a printing ink to realize quick construction of a highly artificial organ. The acoustic fluid-mediated 3D bioprinting technique has the characteristics of quick printing and reuse and has the advantages of controllable cell concentration and no modification of cells.

Specifically, in the invention, a vortex is generated by array focused SAWs and a circular acoustic field boundary. First, each focused interdigital electrode generates focused pulse SAWs on the surface of a lithium niobate piezoelectric substrate. Then, the SAWs propagate to be coupled into a flat cylindrical liquid layer, and under the attenuation effect of the acoustic waves in the propagation process, directional flowing of the liquid in the form of liquid pulses is caused in the propagation direction of the acoustic waves. Next, because the liquid pulses do not point to the center of the circular acoustic field boundary and are restrained by the circular acoustic field boundary, a flowing liquid vortex is formed. The flow effect of the vortex is synchronously enhanced by the plurality of focusing interdigital electrodes. Finally, cells in the liquid are driven by the vortex to be aggregated in the central area of the circular acoustic field boundary, thus realizing accurate and controllable enhancement of the cell density.

The invention adopts a cell control method based on acoustic fluid and may realize remote and non-contact control of cells to quickly increase the cell density. Moreover, the printing precision may reach 10 μm, and centimeter-sized tissue structures may be quickly printed within half an hour to complete the construction of tissue structures with a cell density of billion cells per milliliter. The invention may construct tissues of highly artificial structures and may greatly improve the functions of the artificial structures.

BRIEF DESCRIPTION OF THE DRAWINGS

FIGS. 1A-1B are schematic structural diagrams of an acoustic fluid-mediated bottom-up bioprinting device for functional organs with an ultrahigh cell density, wherein FIG. 1A is a schematic structural diagram of an array SAW chip, and FIG. 1B is a schematic structural diagram of the bioprinting device;

FIGS. 4A-4C illustrate images and function representation results of prepared ultrahigh-density hepatic and alveolar tissues, wherein FIG. 4A illustrates bioprinted vascularized hepatic tissue, and II indicates the blood flow; FIG. 4B illustrates the verification and interpretation of function enhancement of artificial hepatic tissues on the molecular level, ALB and TAT in the left chart are albumin genes and tyrosine aminotransferase of parenchymal hepatic cells, and ALB in the right chart is albumin; FIG. 4C illustrates the reproduction of the respiratory function of pulmonary alveoli.

DETAILED DESCRIPTION OF THE EMBODIMENTS

The invention is further described below in conjunction with accompanying drawings and specific embodiments.

Figure 1A:
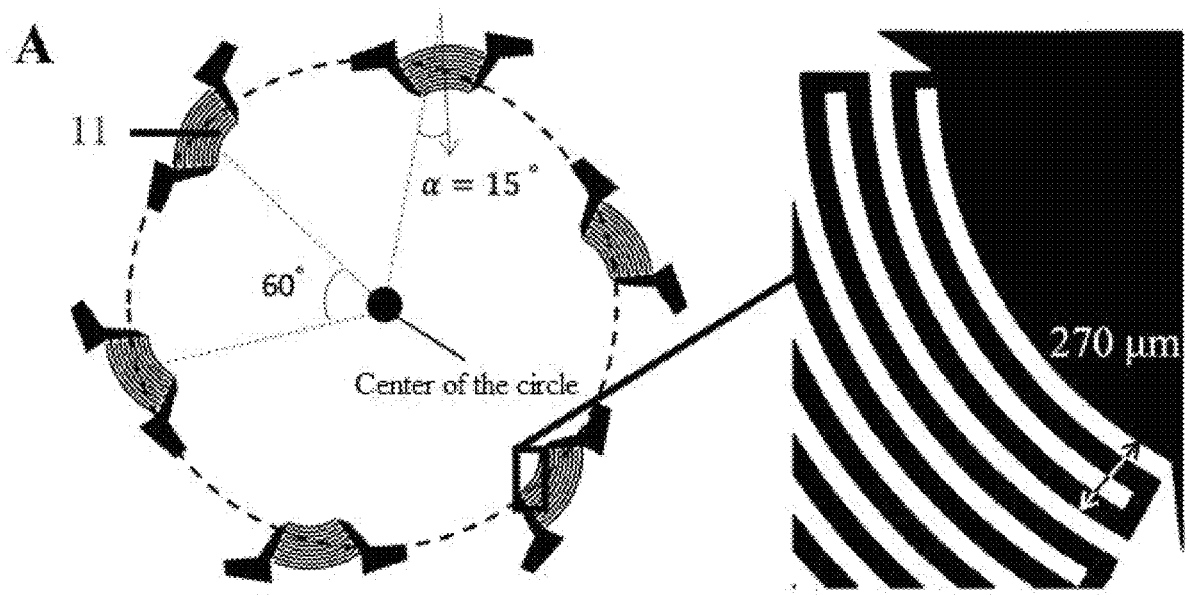
Figure 1B:
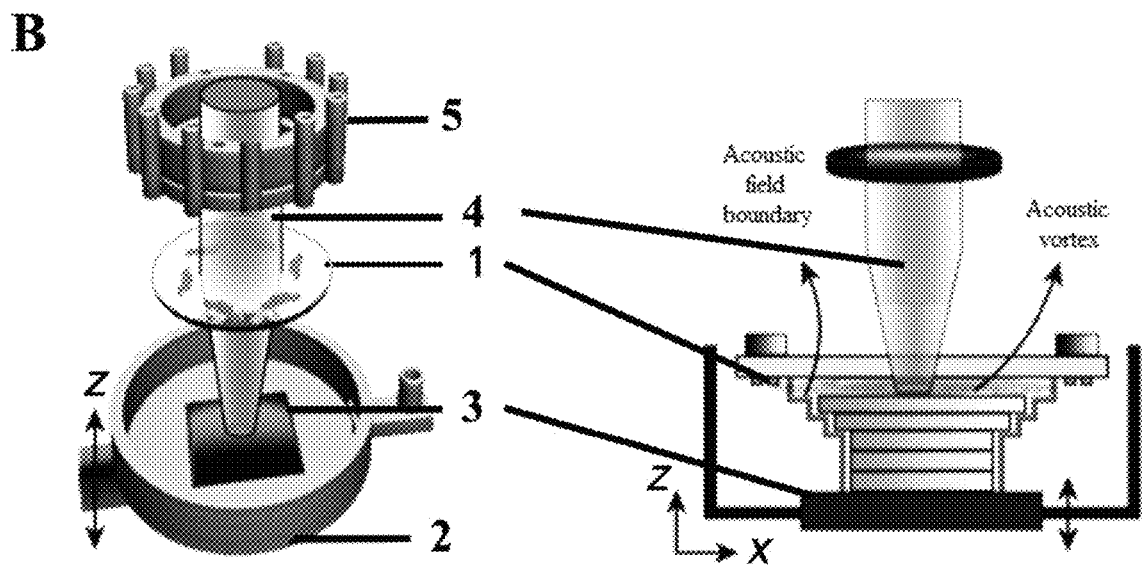

As shown in FIGS. 1A-1B, the invention provides an acoustic fluid-mediated bottom-up bioprinting device for functional organs with an ultrahigh cell density, including an array surface acoustic wave (SAW) chip 1, a printing container 2, a printing platform 3, a curing light source 4 and a printing head 5.

The printing container 2 is used for containing a printing ink, and the printing ink is a mixed solution of cells and a photocurable bioink.

The printing platform 3 is horizontally arranged in the printing container 2 and is able to move upward and downward in the printing ink.

The printing head 5 is fixed and located above the printing container 2. The array SAW chip 1 is fixed to a lower end of the printing head 5.

The array SAW chip 1 includes a plurality of interdigital electrodes 11 which are arranged in a same horizontal plane and distributed on a circle. The interdigital electrodes 11 are focused SAW interdigital electrodes. The central axis of each interdigital electrode 11 deflects from a direction towards the center of the circle (that is, deflects from a connecting line between the interdigital electrode 11 and the center of the circle), and the plurality of interdigital electrodes 11 deflect in a same direction (clockwise or counterclockwise).

The array SAW chip 1 is in contact with the printing ink (the array SAW chip 1 may be in contact with the surface of the printing ink or stretch into the printing link to realize contact) and is able to form a focused acoustic flow in the printing ink between the array SAW chip 1 and the printing platform 3 to aggregate the cells in the printing ink.

The curing light source 4 is fixed in the printing head 5 and located above the array SAW chip 1. The curing light source 4 is able to expose a projection into the printing ink above the printing platform 3 and cure the printing ink above the printing platform 3.

During printing, the transparent array SAW chip 1 functions as an upper interface for bottom-up printing to keep the surface of the printing link smooth.

Preferably, in the array SAW chip 1, the plurality of interdigital electrodes have a same angle of deflection, and the angle of deflection is greater than 0° and less than 90°, such as 15° or 20°. The plurality of interdigital electrodes are uniformly distributed on the circle, for example, six interdigital electrodes are distributed on the circle at an interval of 60°, or eight interdigital electrodes are distributed on the circle at an interval of 45°. The plurality of interdigital electrodes 11 share a same piezoelectric substrate, that is, multiple electrode patterns are machined on the same piezoelectric substrate. 3-10 pairs, such as 5 or 6 pairs, of electrodes are arranged in the interdigital electrode 11, and the wavelength of the interdigital electrodes 11 is 200-350 μm, such as 270 μm or 300 μm. A drive signal for the array SAW chip 1 is a sine alternating current input of a 250 mVpp voltage.

The array SAW chip is made based on a semiconductor preparation process. First, the electrode arrangement is designed by means of computer-assisted software, and then metal electrodes are machined on a piezoelectric substrate by means of standard soft photolithography and electron beam metal deposition. In one specific embodiment, the diameter of a circular working region is designed to be 1 cm; the wavelength, arrangement and orientation of the interdigital electrodes are designed by means of AutoCAD software; a mask of the electrodes is obtained by thermoforming, the lithium niobate piezoelectric substrate is spin-coated with an AZ-series positive photoresist, and electrode patterns on the mask are obtained by replication and elution; a chromium film with a thickness of 5 nm and a gold film with a thickness of 50 nm are deposited on the piezoelectric substrate by electron beam evaporation; and finally, the predesigned array SAW chip is obtained by elution with 60° C. formaldehyde. The piezoelectric substrate is fixed to the printing head, and the electrode patterns (gold electrodes) face the printing ink.

Preferably, the printing container 2 is able to move upward and downward to realize printing of tissue organs with a large thickness.

The invention further provides a printing method for the acoustic fluid-mediated bottom-up bioprinting device for functional organs with an ultrahigh cell density.

For a monolayer tissue organ, the printing method includes the following steps:

S1.1, a circular projection is exposed by the curing light source to cure the printing ink to form a circular acoustic field boundary.

S1.2, the array SAW chip is turned on to form a focused SAW acoustic field to induce a fluid vortex within the acoustic field boundary to aggregate the cells in the printing ink.

S1.3, a projection in a shape to be printed is exposed by the curing light source to cure the printing ink to form a tissue organ, which contains the aggregated cells and is in the shape to be printed.

S1.4, a projection containing the shape of the printed tissue organ is exposed by the curing light source to cure the printing ink to form a monolayer print structure containing the tissue organ formed in S1.3.

For a multilayer tissue organ, the printing method includes the following steps:

S1, a monolayer print structure is printed according to the printing method for the monolayer tissue organ.

S2, the printing platform 3 is moved downward, and S1.1-S1.4 are repeated to print a second layer of print structure on the monolayer print structure.

S3, S2 is repeated n times to obtain an (n+2)-layer print structure, wherein n≥0.

Wherein, the distance between the array SAW chip 1/a lower surface of a previous layer of print structure and the printing platform 3 is equal to the thickness of a current layer of print structure. That is, in S1, the distance between the array SAW chip 1 and the printing platform 3 is equal to the thickness of a single layer of printed tissues. In S2, the distance between the lower surface of the previous layer of print structure and the printing structure 3 (the descent distance of the printing platform 3) is equal to the thickness of the current layer of print structure.

In the invention, cell aggregation in liquid is realized by adjusting the distribution of a focused SAW acoustic field array and the boundary condition of the fluid. Different cell aggregation velocities, areas and extents are obtained by adjusting the intensity of the acoustic field, the layer thickness of the fluid and the initial cell concentration. Specifically, the plurality of interdigital electrodes that deflect in the same direction and point to the center of the circle generate SAWs, then a liquid vortex is formed by means of the circular acoustic field boundary, that is, a stable focused acoustic flow is generated by the array SAW chip to realize cell aggregation towards the center in the liquid, and specifically, the cells in the printing ink may be efficiently and controllably aggregated in the central area under a layer thickness of 40 μm. By increasing or decreasing the power intensity of the signal input of the array SAW chip, the focused acoustic flow will be accelerated or decelerated, and correspondingly, the time and range of cell aggregation towards the central area will be increased or decreased. By changing the angle of deflection of the interdigital electrodes in the array SAW chip, the focused acoustic flow will change correspondingly to control the aggregation state of cells.

In the invention, remote and controllable concentration and aggregation of cells in a photocrosslinkable bioink for stereolithography are realized by means of the array SAW chip and bottom-up stereolithography, thus realizing ultra-high-density 3D bioprinting, such as density-controllable spatial structure construction of hepatocytes, alveolar epithelial cells and fibroblasts; and vascular structures inside may be realized at the same time.

Figure 2A:
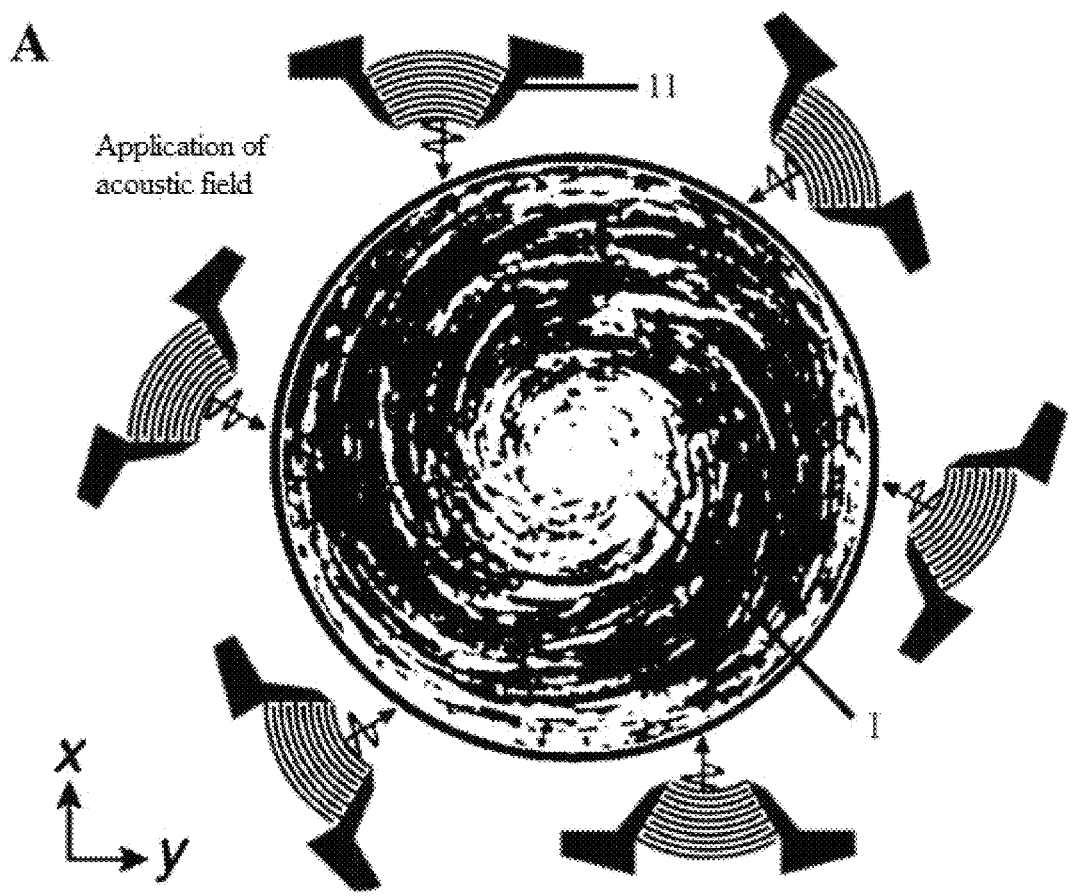
FIGS. 2A-2B are schematic diagrams of cell aggregation by a focused SAW acoustic field.
Figure 2B:
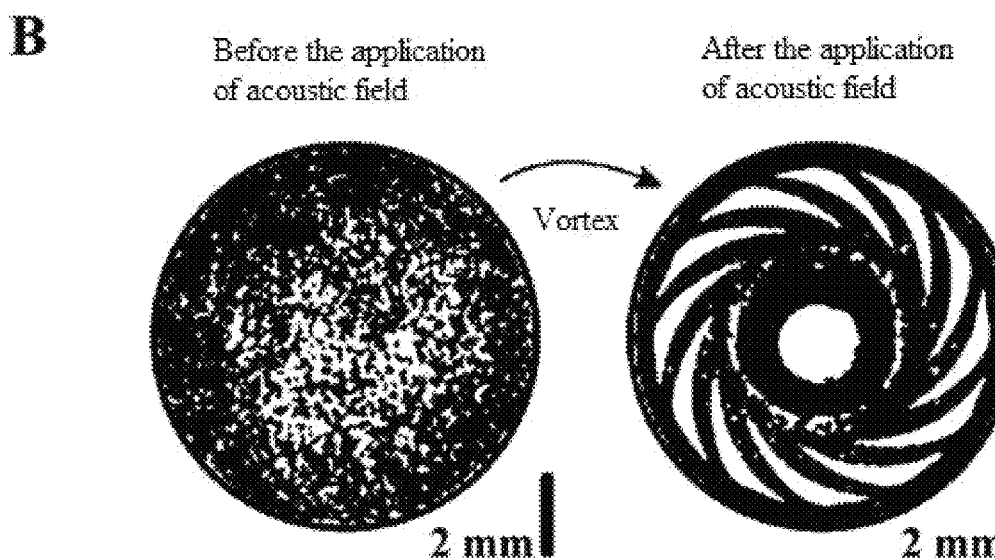
Figure 3A:
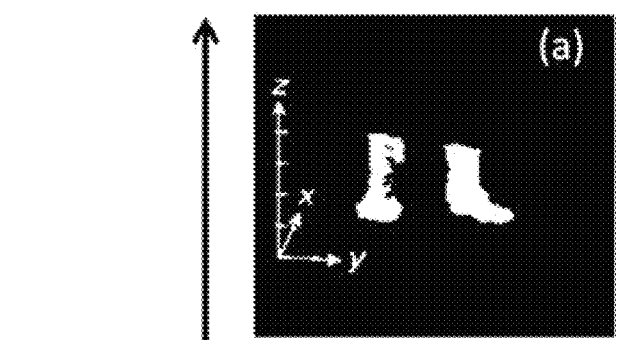
FIGS. 3A-3E illustrate images of prepared ultrahigh-density 3D human cell structures, wherein FIGS. 3A-3E respectively illustrate cell structures corresponding to the feet, the knees, the waist and the body.
Figure 3B:
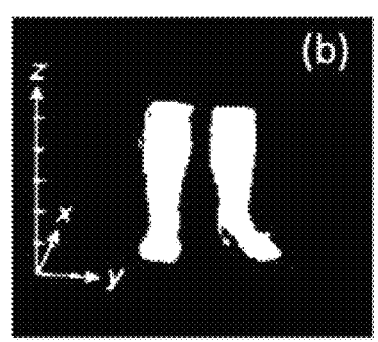
Figure 3C:
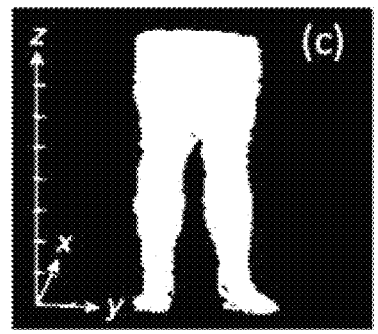
Figure 3D:
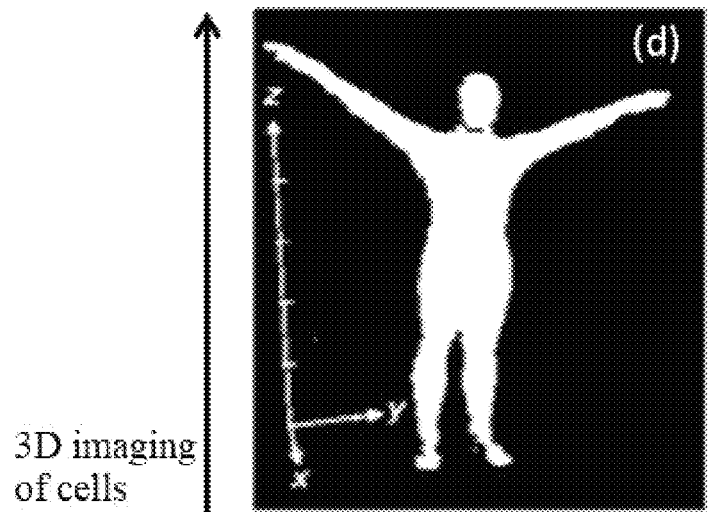
Figure 3E:
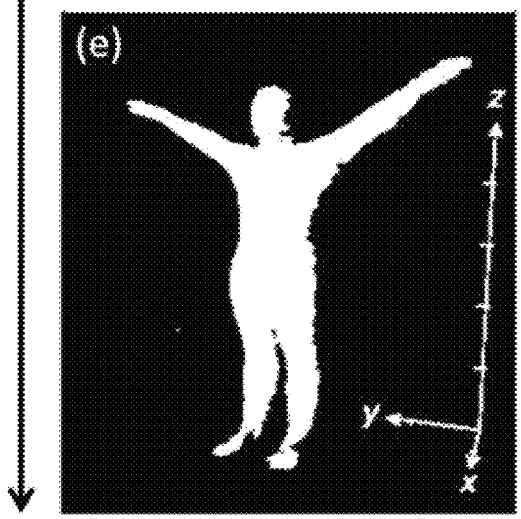

In one specific embodiment, as shown by A in FIGS. 1A-1B, an array SAW chip having a diameter of 1 cm and including six interdigital electrodes that deflect counter-clockwise by 15° and face the center is machined by standard soft lithography for semiconductor processing, five pairs of electrodes are designed in the interdigital electrode, and the wavelength of the interdigital electrodes is 270 μm. As shown in FIGS. 2A-2B, within the circular acoustic field boundary, a liquid vertex I is formed in the central area under the action of a sine alternating current signal of a 250 mVpp voltage and continuously drags the cells. The printing ink, including 10% (v/v) gelatin, a photoinitiator ruthenium (Ru)/sodium persulfate (SPS) (1 mM/10 mM), and cells with a density of one million per milliliter, is added to the printing container. The printing ink may also include 10% (v/v) methacrylic acid hydrogel (GelMA), a 1% photoinitiator phenyl-2,4,6-trimethylbenzoylphosphinate (LAP), and cells with a density of one million per milliliter.

First, a circular hydrogel boundary (acoustic field boundary) with a diameter of 1 cm is formed by exposure. Then, a focused SAW acoustic field is excited, and after cell aggregation for 20 s, cells in the central area come in close contact. Then, a structure to be printed is projected, and exposure is performed for 5 s, wherein the intensity of exposure is 50 mW/cm2. Finally, a whole layer of printing ink containing the cells is cured to obtain a piece of 2D cell gel with a high density and high mechanical strength.

The printing platform is controlled by programming software to move downward for 40 μm to print a next layer of cells; after cells stand for 15 s, the steps for printing the first layer of cells, including printing of the acoustic field boundary, cell aggregation, patterned aggregation of the printing ink, and curing of a whole layer of printing ink, are repeated. All these steps are repeated to finally obtain a complex tissue structure with a high cell density, as shown in FIGS. 3A-3E. The thickness of the human structure is 1.5 mm, and the layer thickness is accurate to 40 μm.

Figure 4A:
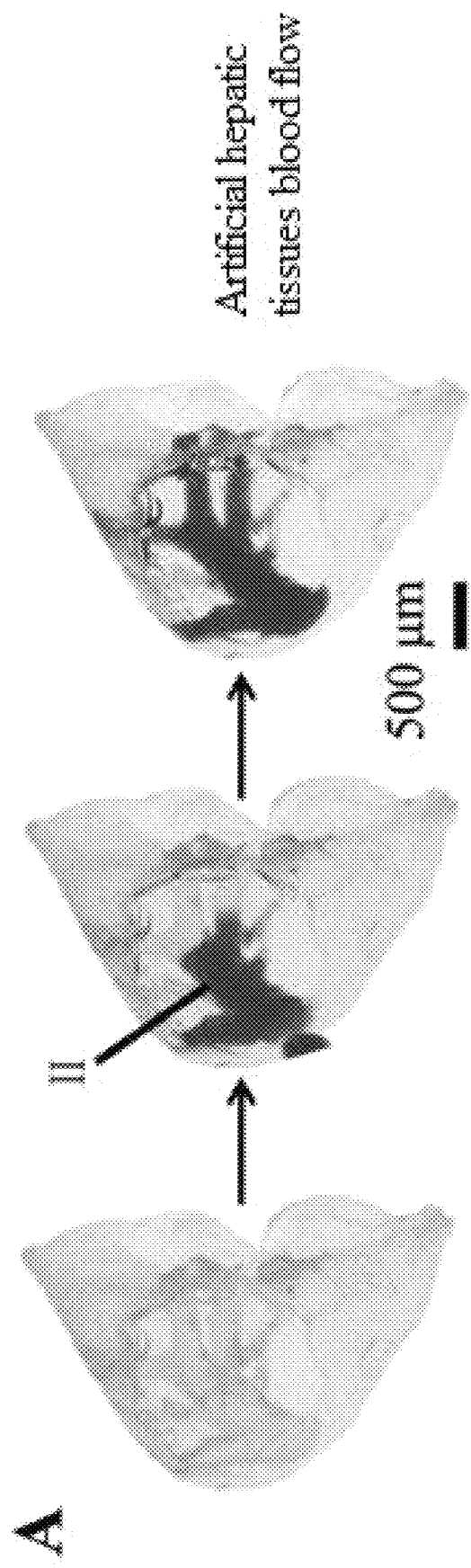
Figure 4B:
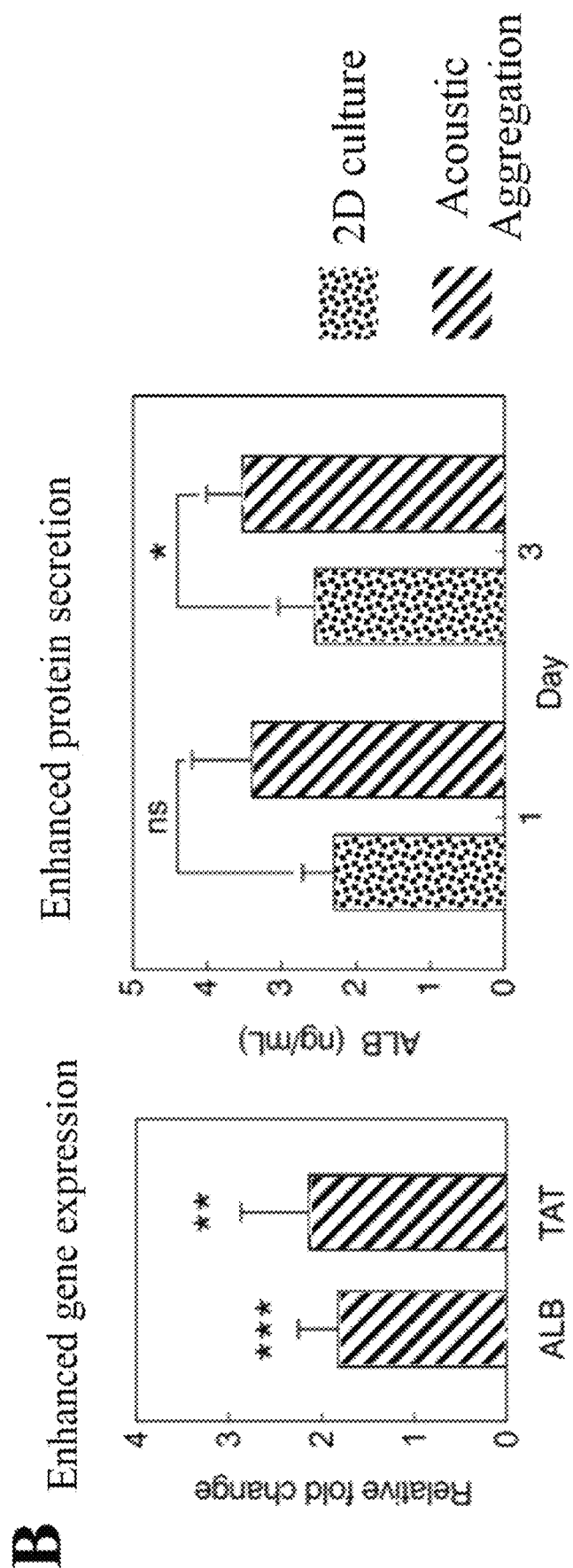
Figure 4C:
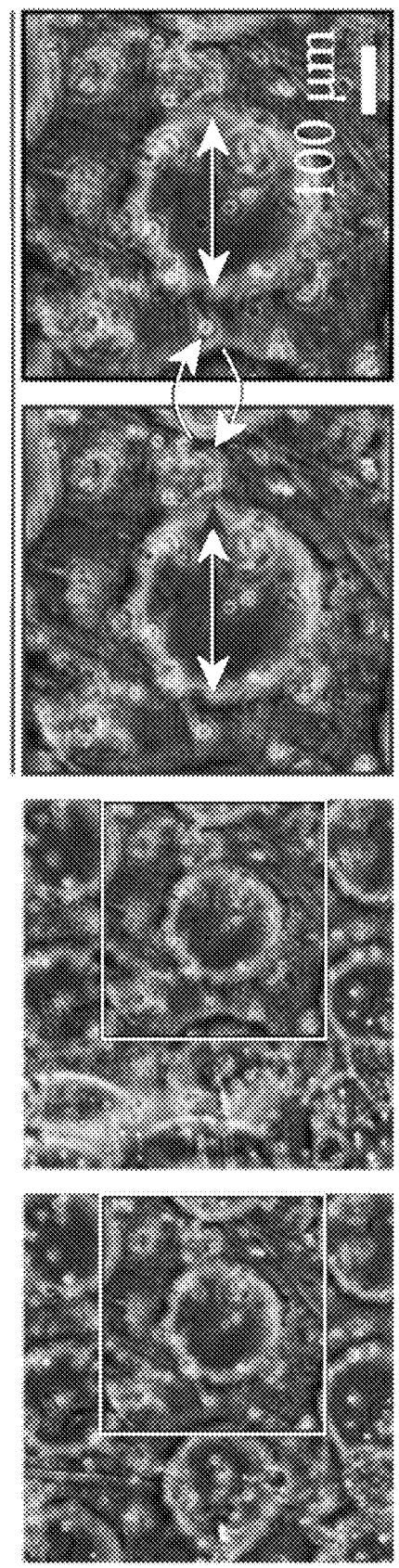

In another specific embodiment, a high-density artificial hepatic structure is printed layer by layer by means of cells of a target organ (hepatocytes), and quick maturation of the function of a hepatic tissue model is realized, as shown in FIGS. 4A-4C. Artificial hepatic tissues are obtained by means of hepatocytes, reproduction of vascular structures is realized while the artificial structure is obtained, and the close cell contact enhances the specific functional gene expression of hepatic cells and the secretion function of hepatic tissues.

In another specific embodiment, a high-density artificial alveolar structure is printed layer by layer by means of cells of a target organ (alveolar epithelial cells), and reproduction of the respiratory function of an alveolar tissue model is realized, as shown in FIGS. 4A-4C.

In the invention, unless otherwise stated, all scientific and technical terms used here have the same meanings as those commonly understood by those skilled in the art. In addition, reagents, materials and operations here are all reagents, materials and normal operations widely used in the corresponding field.

It should be noted that terms such as "upper", "lower", "left", "right", "front" and "back" are cited in the invention merely for a clear description and are not used to limit the implementation scope of the invention, and all transformations or adjustments of the relative relations of these terms made without substantive changes of the technical contents should also fall within the implementation scope of the invention.

Finally, it should be noted that the above embodiments are merely preferred ones of the invention and are not used to limit the invention. Although the invention has been described in detail with reference to the above embodiments, those skilled in the art may still make modifications to the technical solutions in the above embodiments or make equivalent substitutions to part of the technical features in the embodiments. Any modifications, equivalent substitutions and improvements made based on the spirit and principle of the invention should also fall within the protection scope of the invention.

What is claimed is:

1. An acoustic fluid-mediated bottom-up bioprinting device for functional organs with an ultrahigh cell density, comprising:
   an array surface acoustic wave (SAW) chip, a printing container, a printing platform, and a curing light source;
   wherein the printing container is configured for containing a printing ink, and the printing ink is a mixed solution of cells and a photocurable bioink;
   the printing platform is horizontally arranged in the printing container and is configured to move upward and downward in the printing ink;
   the array SAW chip and the curing light source are both located above the printing container;
   the array SAW chip comprises a plurality of interdigital electrodes arranged in a same horizontal plane and distributed on a circle; the plurality of interdigital electrodes are focused SAW interdigital electrodes; a central axis of each of the plurality of interdigital electrodes deflects from a direction towards a center of the circle, and the plurality of interdigital electrodes deflect in a same direction;
   the array SAW chip is in contact with the printing ink and is configured to form a focused acoustic flow in the printing ink between the array SAW chip and the printing platform to aggregate the cells in the printing ink; and
   the curing light source is configured to expose a projection into the printing ink above the printing platform and cure the printing ink above the printing platform;
   a printing head, and the array SAW chip is fixed to a bottom of the printing head, and the curing light source being fixed in the printing head and located above the array SAW chip.

2. The acoustic fluid-mediated bottom-up bioprinting device for the functional organs with the ultrahigh cell density according to claim 1,
   wherein in the array SAW chip, the plurality of interdigital electrodes have a same angle of deflection.

3. The acoustic fluid-mediated bottom-up bioprinting device for the functional organs with the ultrahigh cell density according to claim 1,
   wherein an angle of deflection of the plurality of interdigital electrodes is greater than 0° and less than 90°.

4. The acoustic fluid-mediated bottom-up bioprinting device for the functional organs with the ultrahigh cell density according to claim 1, wherein in the array SAW chip, the plurality of interdigital electrodes are distributed uniformly; and wherein the array SAW chip comprises a lithium niobate piezoelectric substrate, and each of the plurality of interdigital electrodes comprises a gold film disposed on the lithium niobate piezoelectric substrate, the gold film facing the printing ink.

5. The acoustic fluid-mediated bottom-up bioprinting device for the functional organs with the ultrahigh cell density according to claim 1, wherein 3-10 pairs of electrodes are arranged in each of the plurality of interdigital electrodes, and a wavelength of each of the plurality of interdigital electrodes is 200-350 μm.

* * * * *